(12) United States Patent
Wang et al.

(10) Patent No.: US 8,742,692 B2
(45) Date of Patent: Jun. 3, 2014

(54) LED DRIVING CIRCUIT AND SHORT-CIRCUIT PROTECTION CIRCUIT

(75) Inventors: Chen-Hsung Wang, New Taipei (TW); Chia-Ming Chan, New Taipei (TW)

(73) Assignee: Green Solution Technology Co., Ltd., New Taipei (TW)

( * ) Notice: Subject to any disclaimer, the term of this patent is extended or adjusted under 35 U.S.C. 154(b) by 250 days.

(21) Appl. No.: 13/239,401

(22) Filed: Sep. 22, 2011

(65) Prior Publication Data

US 2012/0223644 A1 Sep. 6, 2012

(30) Foreign Application Priority Data

Mar. 2, 2011 (TW) .............................. 100106785 A

(51) Int. Cl.
*H05B 37/02* (2006.01)
(52) U.S. Cl.
USPC ............................ 315/307; 315/186; 315/193
(58) Field of Classification Search
USPC ......... 315/186, 192, 193, 291, 307, 308, 312, 315/360
See application file for complete search history.

(56) References Cited

U.S. PATENT DOCUMENTS

| | | | | |
|---|---|---|---|---|
| 6,400,102 B1 * | 6/2002 | Ghanem | ........................ | 315/291 |
| 6,847,169 B2 | 1/2005 | Ito et al. | | |
| 8,427,069 B2 * | 4/2013 | Wibben | ........................ | 315/291 |
| 8,461,777 B1 * | 6/2013 | Mednik et al. | ................ | 315/307 |
| 2005/0269968 A1 | 12/2005 | Ito et al. | | |
| 2010/0301762 A1 | 12/2010 | Kung et al. | | |
| 2011/0062872 A1 * | 3/2011 | Jin et al. | ........................ | 315/122 |

FOREIGN PATENT DOCUMENTS

| | | |
|---|---|---|
| CN | 1859820 | 11/2006 |
| CN | 101605416 | 12/2009 |
| CN | 201422183 | 3/2010 |
| CN | 101715265 | 5/2010 |
| CN | 101860199 | 10/2010 |
| CN | 101945520 | 1/2011 |
| JP | 2007-142139 | 6/2007 |
| TW | 200816127 | 4/2008 |
| TW | 200950589 | 12/2009 |
| TW | 201106600 | 2/2011 |
| TW | 201108856 | 3/2011 |

OTHER PUBLICATIONS

"Office Action of Taiwan Counterpart Application", issued on Nov. 15, 2013, p. 1-p. 14.
"Office Action of China Counterpart Application", issued on Feb. 13, 2014, p. 1-p. 9.

* cited by examiner

*Primary Examiner* — Tung X Le
(74) *Attorney, Agent, or Firm* — Jianq Chyun IP Office

(57) ABSTRACT

An LED driving circuit, adapted to drive an LED module, is disclosed. The LED driving circuit comprises a converting circuit, a converting controller, and a short-circuit protection circuit. The converting circuit, having a capacitor coupled to the LED module, is coupled to an input power source to proceed converting operation to supply an output current for driving the LED module. The converting controller controls the converting circuit to provide a stable current flowing through the LED module. The short-circuit protection circuit is coupled to the LED module in series and cuts the current flowing through the LED module off when detecting that the current higher than a current protection value.

19 Claims, 2 Drawing Sheets

LED DRIVING CIRCUIT AND SHORT-CIRCUIT PROTECTION CIRCUIT

CROSS-REFERENCE TO RELATED APPLICATION

This application claims the priority benefit of Taiwan application serial no. 100106785, filed on Mar. 2, 2011. The entirety of the above-mentioned patent application is hereby incorporated by reference herein and made a part of this specification.

BACKGROUND OF THE INVENTION (1) Field of the Invention

This invention relates to a short-circuit protection circuit, and more particularly relates to a short-circuit protection circuit for an LED driving circuit.

(2) Description of the Prior Art

FIG. 1 is a circuit diagram of a typical DC-to-DC boost converting circuit, which includes an inductor L, a diode D, a capacitor C, a switch SW, and a controller Con, and is utilized for converting an input power source Vin into an output voltage Vout to drive an LED module Ld to illuminate. In order to have the LED module Ld generate steady illumination, the controller Con detects the level of the output voltage Vout by using a voltage detecting circuit VD to generate a voltage feedback signal VFB to control the duty cycle of the switch SW. Thus, the level of the output voltage Vout can be stabilized to have the LED module Ld generating steady illumination.

Generally, in order to make sure each of the LED units in the LED module Ld has identical LED current flowing thereon for generating identical illumination, the LED units in the LED module Ld are usually connected in serial. When anyone of the LED units is burned to result short-circuit, the other LED units suffers the additional voltage drop to result the increasing of LED current, which may shorten the lifetime of the LED units. If the LED module is not properly assembled to the output end of the DC-to-DC boost converting circuit or any other issues which may ground the output end, the voltage from the input voltage source Vin would be continuously applied to the inductor L, which may damage the inductor L and the diode D.

SUMMARY OF THE INVENTION

According to the damage issues resulted from the short-circuit in the LED module or the converting circuit in prior art, the present invention detects the abnormal increasing of load current because of short-circuit and divides or stops the output current according to the detection result so as to achieve the object of short-circuit protection. In addition, it is another object of the present invention to prevent the output voltage from the converting circuit applied to the controller directly to damage the controller as the LED module or the converting circuit has a short-circuit.

To achieve the above mentioned object, a short-circuit protection circuit utilized for detecting a state of a load for processing a protection procedure is provided in the present invention. A converting circuit is coupled to a load and a capacitance connected in parallel and provides an output current, and a controller stabilizes a load current flowing through the load at a predetermined current value according to a current feedback signal. The short-circuit protection circuit includes a current detecting unit and a protection detecting unit. The current detecting unit is coupled to the load for generating the current feedback signal according to the load current flowing through the load. The protection detecting unit is coupled to the converting circuit for determining whether the load current flowing through the load exceeding a current protection value or not. As the load current exceeds the current protection value, the protection detecting unit conducts a partial current of the output current.

Another short-circuit protection circuit for detecting a state of a load for processing a protection procedure is also provided in the present invention. A controller controls a converting circuit according to a current feedback signal to drive the load connected with a capacitance in parallel. The short-circuit protection circuit includes a current detecting unit, a switch, and a protection detecting unit. The current detecting unit is coupled to the load for generating the current feedback signal according to a load current flowing through the load. The switch is coupled to the load for starting or stopping the load current. The protection detecting unit is coupled to the converting circuit and controls the switch to stop the load current when determining the load current flowing through the load exceeding a current protection value.

A LED driving circuit for driving a LED module is also provided in the present invention. The LED driving circuit includes a converting circuit, a converting controlling circuit, and a short-circuit protection circuit. The converting circuit is coupled to an input power source for proceeding converting operation to supply an output current to drive the LED module. The converting circuit has a capacitor coupled to the LED module. The converting controlling circuit controls the converting circuit according to a load current flowing through the LED module to have the load current stabilized at a predetermined current value. The short-circuit protection circuit is coupled to the LED module in series and stops the load current when determining the load current flowing through the LED module exceeding a current protection value.

BRIEF DESCRIPTION OF THE DRAWINGS

The present invention will now be specified with reference to its preferred embodiment illustrated in the drawings, in which.

DESCRIPTION OF THE PREFERRED EMBODIMENT

Figure 1:
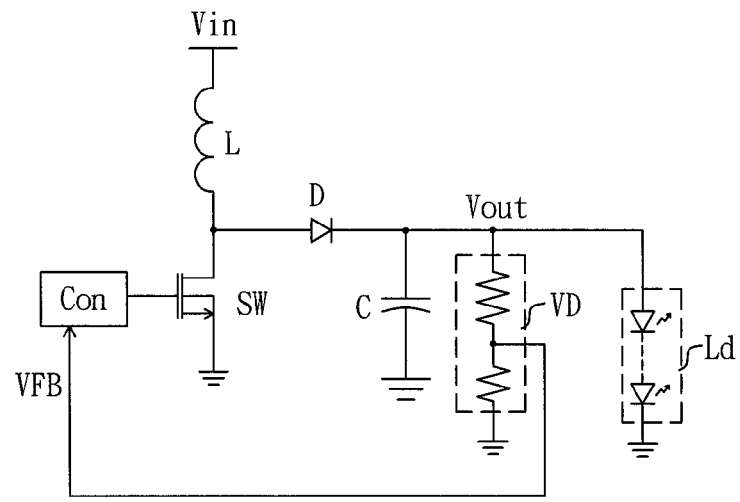
FIG. 1 is a circuit diagram of a typical DC-to-DC boost converting circuit.
Figure 2:
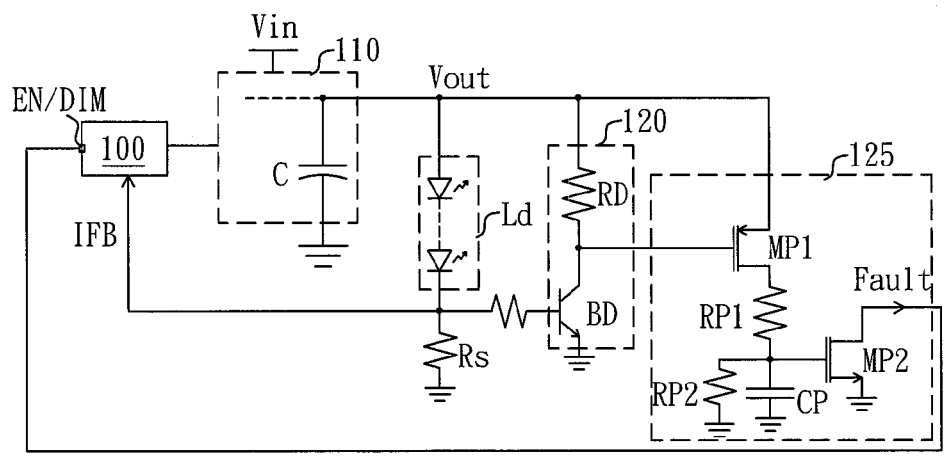
FIG. 2 is a circuit diagram of a power converting circuit in accordance with a first preferred embodiment of the present invention.

FIG. 2 is a circuit diagram of a power converting circuit in accordance with a first preferred embodiment of the present invention. The power converting circuit includes a converting controller 100, a converting circuit 110, and a short-circuit protection circuit, and is utilized for converting an input power source Vin into an output voltage Vout to drive a load Ld. The converting circuit 110 also has a capacitor C for stabilizing the output voltage Vout. In the present embodiment, the converting circuit may be an AC-to-DC converting circuit or a DC-to-DC converting circuit, such as the full-bridge converter, the half-bridge converter, the flyback converter, the forward converter, the step-up converter, the step-down converter, and etc. A current detecting unit Rs is coupled to the load Ld for generating a current feedback signal IFB according to the load current flowing through the load Ld. The converting controller 100 receives the current feedback signal IFB and controls the converting circuit 110 to adjust the output voltage Vout accordingly so as to provide an output current stabilized at a predetermined current value flowing through the load Ld.

The short-circuit protection circuit includes the current detection unit Rs and a protection detecting unit 120. The short-circuit protection circuit is coupled to the load Ld and proceeds a protection procedure when determining the load current flowing through the load Ld exceeds a current protection value. In the present embodiment, the protection procedure is carried out by dividing the output current to inhibit the increasing of load current flowing through the load Ld. The protection detecting unit 120 includes a resistor RD and a bipolar junction transistor BD. The resistor RD is coupled to the output end of the converting circuit 110 and the collecter electrode of the bipolar junction transistor BD. The base electrode of the bipolar junction transistor BD is coupled to the junction between the load Ld and the current detecting unit Rs, and the emitter electrode is grounded. Take a LED module as the load Ld for example. As anyone of the LED units has a short circuit, because of the regulating ability of the capacitor C, the output voltage Vout would not drop in a sudden, however, the load current flowing through the LED module may suddenly increase. As the load current is over the current protection value, the voltage drop across the current detecting unit Rs is large enough to turn on the bipolar junction transistor BD and the protection detecting unit 120 begins to divide the output current to keeps the voltage drop across the current detecting unit Rs at a value just greater than forward bias voltage of the bipolar junction transistor BD. That is, the load current flowing through the load Ld would be clamped at the adjacent of a current protection value, which is a little greater than that of the forward bias voltage of the bipolar junction transistor BD divided by the resistance of the current detecting unit Rs. Based on the above setting, the abrupt large current, which may reduce lifetime of the LED module or even damage the LED module, can be prevented.

In addition, the present embodiment could have a protection noticing circuit 125 for determining whether the short-circuit protection circuit keeps dividing the output current or not, if so, the protection noticing circuit 125 generates a protection signal to notice the converting controller 100 to stop converting operation of the converting circuit 110. The protection noticing circuit 125 includes two switches MP1, MP2, two resistors RP1,RP2, and a capacitor CP. The switch MP1 is a P-type MOSFET, which has a source electrode coupled to the output end of the converting circuit 110, a drain electrode coupled to one end of the resistor RP1, and a gate electrode coupled to the junction between the resistor RD and the bipolar junction transistor BD in the protection detecting unit 120, and the resistor RP2 and the capacitor CP are connected between the other end of the resistor RP1 and the ground. The switch MP2 is a N-type MOSFET, which has a drain electrode coupled to the converting controller 100, a source electrode grounded, and a gate electrode coupled to a junction between the resistors RP1 and RP2. Under normal operation, the switch MP1 would be cut off as the level of the gate electrode is equal to the level of the source electrode. As an LED unit has a short circuit, the short-circuit protection circuit divides the output current to flow through the resistor RD. When the level of the gate electrode of the switch MP1 is reduced to turn the switch MP1, the capacitor CP is charged.

However, because of the feedback control of the converting controller 100, the output voltage Vout drops quickly to have the LED current flowing through the LED module back to the predetermined current value. Then, the short-circuit protection circuit stops dividing output current and the switch MP1 is turned off again. At this time, the level of the capacitor CP is not high enough to turn on the switch MP2 such that a temporary increasing of LED current would not trigger the protection noticing circuit 125 to generate the protection signal Fault. However, as the short-circuit protection circuit keeps dividing the output current over a predetermined time period to have the voltage level of the capacitor CP reaches the level to turn on the switch MP2 for generating the protection signal Fault. The converting controller 100 may receive the protection signal Fault from the enabling pin EN or the dimming pin DIM so as to stop the converting operation of the converting circuit 110 and have the converting circuit 110 stops transmitting energy from the input power source Vin to the output end thereof. In addition, although the protection noticing circuit 125 and the converting controller 100 are described as two separate units according to the above description, the present invention is not so restricted. The protection noticing circuit and the converting controller 100 may be regarded as a converting controlling circuit integrated in a single integrated circuit. The short-circuit protection circuit may be integrated in the integrated circuit also. Besides, the protection signal Fault may be transmitted to other circuit(s), such as the input power source Vin, for proceeding protection operations.

Figure 3:
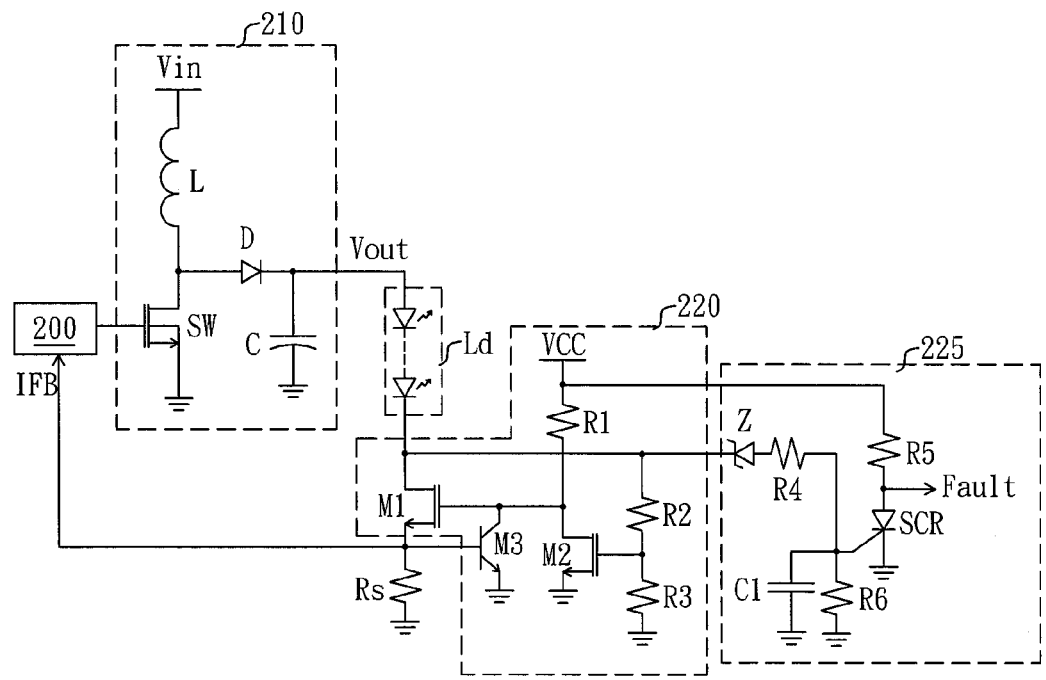
FIG. 3 is a circuit diagram of a power converting circuit in accordance with a second preferred embodiment of the present invention.

FIG. 3 is a circuit diagram of a power converting circuit in accordance with a second preferred embodiment of the present invention. As shown, the power converting circuit includes a converting controller 200, a converting circuit 210, and a short-circuit protection circuit, and is utilized for converting an input power source Vin into an output voltage Vout for driving a load Ld. The converting circuit 210 is a DC-to-DC boost converting circuit, which has an inductor L, a switch SW, a diode D, and a capacitor C. A current detection unit Rs is coupled to the load Ld for generating a current feedback signal IFB according to the load current. The converting controller 200 receives the current feedback signal IFB and adjusts the level of the output voltage Vout of the converting circuit 210 accordingly so as to have an output current flowing through the load Ld stabilized at a predetermined current value.

The short-circuit protection circuit includes a current detection unit Rs and a protection detecting unit 220, and is coupled to the load Ld for proceeding a protection procedure as the current flowing through the load Ld over a current protection value is determined. In the present embodiment, the protection procedure is to cut off the current flowing through the load Ld. The protection detecting unit 220 includes a MOSFET M1, a trigger circuit, and a latch circuit. The trigger circuit includes resistors R2,R3 and a bipolar junction transistor M3. The latch circuit includes a resistor R1 and a MOSFET M2. The MOSFET M1 is an N-type MOSFET, which has a drain electrode coupled to the load Ld and a source electrode coupled to the current detection unit Rs. The resistor R1 has one end coupled to a voltage source VCC and the other end coupled to the MOSFET M2. The MOSFET M2 is an N-type MOSFET, which has a drain electrode coupled to the resistor R1 and the gate electrode of the MOSFET M1 and a source electrode grounded. The resistors R2 and R3 are serially connected between the load Ld and the ground, and a junction between the resistors R2 and R3 is coupled to the gate electrode of the MOSFET M2. The bipolar junction transistor M3 has a base electrode coupled to the current detecting unit Rs, a collector electrode coupled to the junction between the resistor R1 and the MOSFET M2, and an emitter electrode grounded. Under normal operation, the converting controller 200 has the current flowing through the load Ld stabilized at a predetermined current value. At this time, the voltage drop acrossing the current detecting unit Rs is not large enough to turn on the bipolar junction transistor M3 and the short-circuit protection circuit would not operate. Thus, the gate voltage of the MOSFET M1 would be enhanced due to the resistor R1 such that the MOSFET M1 is turned on and the current is conducted to the load Ld. In the present embodiment, the LED module is also used as the load Ld for describing the operation of the short-circuit protection circuit. As shown, the capacitor C is coupled to the load Ld in parallel, if anyone of the LED units in the load Ld has a short circuit, the output voltage Vout would not drop in a sudden but the LED current flowing through the LED module may quickly increase. As the LED current is over the current protection value to conduct the bipolar junction transistor M3, the current flows from the voltage source VCC through the resistor R1 and the bipolar junction transistor M3 such that the level of the collector electrode of the bipolar junction transistor M3 decreases to turn off the MOSFET M1. Meanwhile, the level at the junction between the resistor R2 and R3 is not high enough to turn on the MOSFET M2. Then, the bipolar junction transistor M3 would be turned off again because no current is generated flowing through the current detecting unit Rs, and the MOSFET M1 is thus turned on again. Then, the voltage level of the capacitor C drops and so the power converting circuit retrieves its normal operation. As plural LED units simultaneously have short circuits or the output end of the converting circuit 210 is grounded through the MOSFET M1 and the current detecting unit Rs, the bipolar junction transistor M3 may cut off the MOSFET M1 and so the level of the drain electrode of the MOSFET M1 increases. Meanwhile, because the divided voltage generated by the resistors R2 and R3 is high enough to conduct the MOSFET M2 of the latch circuit, the off state of the MOSFET M1 continuous because of the conduction of the MOSFET M2 so as to fulfill the latch requirement. At this time, although the bipolar junction transistor M3 would be turned off because no current flowing through the current detecting unit Rs is generated, the level of the junction between the load Ld and the MOSFET M1 would be kept at a high level to continue the on state of the MOSFET M2 for the latch requirement. Thus, the short-circuit protection circuit provided in the present embodiment may inhibit abrupt large current to shorten the lifetime of the LED module or even damage the LED module. In addition, as the output end of the converting circuit 210 has a short circuit, the inductor L is grounded through the diode D so as to maintain a voltage drop acrossing the inductor L. At this time, the controlled off state of the MOSFET M1 may keep the output voltage of the converting circuit 210 at a level close to the level of the input power source Vin to prevent the inductor L from being damaged by the increasing inductor current. Moreover, the off state of the MOSFET M1 may also prevent the level of the current feedback signal IFB being enhanced to the level of the output voltage Vout to damage the converting controller 200.

In addition, a protection noticing circuit 225 may be added in the present embodiment for determining whether the condition of no current flowing through the load Ld continues. If so, a fault signal Fault is generated to notice other circuits to stop operating. The protection noticing circuit 225 includes resistors R4,R5,R6, a zener diode Z, a capacitor C1, and a silicon controlled rectifier SCR. The resistor R5 has one end coupled to the voltage source VCC and the other end coupled to the anode of the silicon controller rectifier SCR for providing a forward bias voltage. The negative end of the zener diode Z is coupled to the drain electrode of the MOSFET M1. The resistors R4 and R6 are serially connected between the positive end of the zener diode Z and the ground, and the junction between the resistors R4 and R6 is coupled to the gate of the silicon controlled rectifier SCR. As the level of the drain electrode of the MOSFET M1 is enhanced to a level higher than the breakdown voltage of the zener diode Z, a current flows through the zener diode Z, the resistor R4 to charge the capacitor C1. When the current charges the capacitor C1, i.e., the MOSFET M1 is turned off, over a predetermined time period, a voltage across the capacitor C1 is higher than the forward bias voltage. Therefore, the silicon controlled rectifier SCR is conducted to generate the protection signal Fault.

Figure 4:
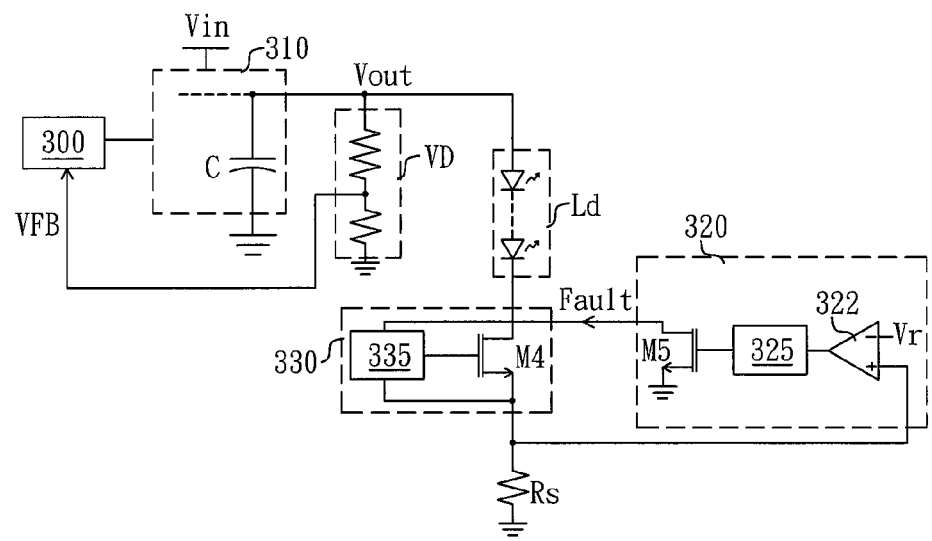
FIG. 4 is a circuit diagram of a power converting circuit in accordance with a third preferred embodiment of the present invention.

FIG. 4 is a circuit diagram of a power converting circuit in accordance with a third preferred embodiment of the present invention. As shown, the power converting circuit includes a converting controller 300, a converting circuit 310, and a short-circuit protection circuit, and is utilized for converting an input power source Vin into an output voltage Vout to drive a load Ld. The converting circuit 310 includes a capacitor C. In addition, a voltage detecting circuit VD is coupled to the converting circuit 310 for generating a voltage feedback signal VFB according to the output voltage Vout and controls the converting circuit 310 to stabilize the output voltage Vout. The present embodiment also has a regulator circuit 330 couple the load Ld, which including a switch M4 and a regulator controller 335. In addition, a current detecting unit Rs is coupled to the load Ld for generating a current feedback signal IFB according to the current flowing through the load Ld. The regulator controller 335 controls the state of the switch M4 according to the current feedback signal IFB so as to adjust the equivalent resistance of the switch M4 to have the current flowing through the load Ld stabilized at a predetermined current value. However, because of the interior circuit delay or the delay circuit for preventing misjudgement, the regulator controller 335 still has the problem of abrupt current.

The short-circuit protection circuit includes a current detecting unit Rs and a protection detecting unit 320. The short-circuit protection circuit is coupled to the load Ld for proceeding a protection procedure as the current flowing through the load Ld over a current protection value is determined. The protection detecting unit 320 includes a comparator 322, a latch circuit 325, and a protection noticing circuit M5. The comparator 322 has an inverting input receiving a protection reference signal Vr and a non-inverting input coupled to the current detecting unit Rs for receiving the current feedback signal IFB. As the current flowing through the load Ld exceeds the current protection value, the level of the current feedback signal IFB is higher than the level of the protection reference signal Vr and thus the comparator 322 outputs a high level signal. In the present embodiment, the protection noticing circuit M5 is a MOSFET with a default off state. The latch circuit 325 turns on the MOSFET M5 when receiving the high level signal from the comparator 322. At this time, the protection noticing circuit M5 also generates the low level protection signal Fault to stop the current flowing through the load so as to prevent the switch M4 of the regulator controller 335 from being burned by large current.

While the preferred embodiments of the present invention have been set forth for the purpose of disclosure, modifications of the disclosed embodiments of the present invention as well as other embodiments thereof may occur to those skilled in the art. Accordingly, the appended claims are intended to cover all embodiments which do not depart from the spirit and scope of the present invention.

What is claimed is:

1. A short-circuit protection circuit, utilized for detecting a state of a load for proceeding a protection procedure, wherein a converting circuit is coupled to the load and a capacitance connected in parallel and provides an output current, and a controller stabilizes a load current flowing through the load at a predetermined current value according to a current feedback signal, the short-circuit protection circuit comprising:
    a current detecting unit, coupled to the load for generating the current feedback signal according to the load current flowing through the load; and
    a protection detecting unit, coupled to the converting circuit, for determining whether the load current flowing through the load exceeding a current protection value or not, and the protection detecting unit conducts a partial current of the output current as the load current exceeding the current protection value.

2. The short-circuit protection circuit of claim 1, wherein the load is an LED module.

3. The short-circuit protection circuit of claim 2, further comprising a protection noticing circuit, generating a protection signal as the load current flowing through the LED module exceeds the current protection value.

4. The short-circuit protection circuit of claim 3, wherein the controller is a converting controller for controlling the converting circuit to provide a stable output voltage to drive the LED module.

5. The short-circuit protection circuit of claim 4, wherein the protection detecting unit conducts a partial current of the output current to have the load current be stabilizes at the current protection value.

6. The short-circuit protection circuit of claim 2, wherein the controller is a converting controller for controlling the converting circuit to provide a stable output voltage to drive the LED module.

7. The short-circuit protection circuit of claim 6, wherein the protection detecting unit conducts a partial current of the output current to have the load current be stabilizes at the current protection value.

8. A short-circuit protection circuit, utilized for detecting a state of a load for proceeding a protection procedure, wherein a controller controls a converting circuit according to a current feedback signal to drive the load connected with a capacitance in parallel, the short-circuit protection circuit comprising:
    a current detecting unit, coupled to the load, for generating the current feedback signal according to a load current flowing through the load;
    a switch, coupled to the load for starting or stopping the load current; and
    a protection detecting unit, coupled to the converting circuit, the protection detecting unit controlling the switch to stop the load current when determining the load current flowing through the load exceeding a current protection value.

9. The short-circuit protection circuit of claim 8, wherein the protection detecting unit has a trigger circuit and a latch circuit, and the trigger circuit generates a trigger signal to have the latch circuit controlling the switch to stop the load current when the load current exceeds the current protection value.

10. The short-circuit protection circuit of claim 9, further comprising a protection noticing circuit, generating a protection signal to have the converting controller stopping converting operation of the converting circuit as the switch is turned off to stop the load current over a predetermined time period.

11. A LED driving circuit, for driving a LED module, comprising:
    a converting circuit, coupled to an input power source for proceeding power conversion to supply an output current to drive the LED module, and the converting circuit having a capacitor coupled to the LED module;
    a converting controlling circuit, controlling the converting circuit according to a load current flowing through the LED module to have the load current stabilized at a predetermined current value; and
    a short-circuit protection circuit, coupled to the LED module in series, the short-circuit protection circuit stopping the load current when determining the load current flowing through the LED module exceeding a current protection value.

12. The LED driving circuit of claim 11, wherein the converting circuit is a DC-to-DC boost converting circuit.

13. The LED driving circuit of claim 12, wherein the short-circuit protection circuit comprising:
    a switch, coupled to the LED module to start or stop the load current flowing through the LED module; and
    a protection detecting unit, coupled to the converting circuit, and controlling the switch to stop the load current when determining the load current flowing through the LED module exceeding the current protection value.

14. The LED driving circuit of claim 3, wherein the protection detecting unit includes a trigger circuit and a latch circuit, the trigger circuit is utilized for generating a trigger signal to have the latch circuit controlling the switch to stop the load current when the load current flowing through the LED module exceeding the current protection value.

15. The LED driving circuit of claim 13, wherein the short-circuit protection circuit further has a protection noticing circuit, which generates a protection signal to have the converting controlling circuit stopping converting operation of the converting circuit as the switch is turned off over a predetermined time period.

16. The LED driving circuit of claim 11, wherein the short-circuit protection circuit comprising:
    a switch, coupled to the LED module to start or stop the load current flowing through the LED module; and
    a protection detecting unit, coupled to the converting circuit, and controlling the switch to stop the load current when determining the load current flowing through the LED module exceeding the current protection value.

17. The LED driving circuit of claim 16, wherein the protection detecting unit includes a trigger circuit and a latch circuit, the trigger circuit is utilized for generating a trigger signal to have the latch circuit controlling the switch to stop the load current when the load current flowing through the LED module exceeding the current protection value.

18. The LED driving circuit of claim 16, wherein the short-circuit protection circuit further has a protection noticing circuit, which generates a protection signal to have the converting controlling circuit stopping converting operation of the converting circuit as the switch is turned off over a predetermined time period.

19. The LED driving circuit of claim 11, wherein the converting controlling circuit is a regulator circuit coupled to the LED module, the regulator circuit has the switch and a regulator controller, and the regulator controller controls the switch to stabilize the load current flowing through the LED module at the predetermined current value according to the current feedback signal and has the load current becoming zero when receiving the protection signal.

* * * * *